United States Patent
Tong et al.

(10) Patent No.: US 10,503,235 B2
(45) Date of Patent: Dec. 10, 2019

(54) WAKE FROM OFF STATE POWER SYSTEM

(71) Applicants: Hing S Tong, Saratoga, CA (US);
 Darwin Chang, Cupertino, CA (US)

(72) Inventors: Hing S Tong, Saratoga, CA (US);
 Darwin Chang, Cupertino, CA (US)

( * ) Notice: Subject to any disclaimer, the term of this patent is extended or adjusted under 35 U.S.C. 154(b) by 164 days.

(21) Appl. No.: 15/791,743

(22) Filed: Oct. 24, 2017

(65) Prior Publication Data

US 2019/0121415 A1  Apr. 25, 2019

(51) Int. Cl.
 *G06F 1/3206* (2019.01)
 *G06F 1/3212* (2019.01)
 *H02J 9/00* (2006.01)
 *G06F 1/3287* (2019.01)
 *G06F 1/3234* (2019.01)

(52) U.S. Cl.
 CPC .......... *G06F 1/3206* (2013.01); *G06F 1/325* (2013.01); *G06F 1/3212* (2013.01); *G06F 1/3287* (2013.01); *H02J 9/005* (2013.01)

(58) Field of Classification Search
 CPC .................................................. G06F 1/3206
 USPC ....................................................... 713/323
 See application file for complete search history.

(56) References Cited

U.S. PATENT DOCUMENTS

| | | |
|---|---|---|
| 5,247,238 A | 9/1993 | Yang |
| 5,636,288 A | 6/1997 | Bonneville et al. |
| 5,974,552 A * | 10/1999 | Lim ...................... G06F 9/4418 379/142.06 |
| 6,092,207 A * | 7/2000 | Kolinski ................. G06F 1/263 713/323 |
| 6,269,288 B1 | 7/2001 | Smith |
| 6,304,008 B1 | 10/2001 | Goto et al. |
| 6,339,314 B1 | 1/2002 | Bruning |
| 6,445,936 B1 | 9/2002 | Cannon et al. |
| 6,460,143 B1 | 10/2002 | Howard et al. |
| 7,132,763 B2 | 11/2006 | Rendic |
| 7,320,077 B2 | 1/2008 | Kim |
| 7,441,127 B2 | 10/2008 | Sugasawa |
| 7,765,416 B2 | 7/2010 | Zhou |
| 7,843,084 B2 | 11/2010 | Wang et al. |
| 7,910,833 B2 | 3/2011 | McGinley et al. |
| 7,956,591 B2 | 6/2011 | Terlizzi et al. |
| 7,960,648 B2 | 6/2011 | McGinley et al. |
| 8,018,699 B2 | 9/2011 | Smith et al. |
| 8,127,126 B2 | 2/2012 | Lai |
| 8,154,245 B2 | 4/2012 | Veselic |
| 8,222,861 B1 | 7/2012 | Pedersen |
| 8,242,359 B2 | 8/2012 | McGinley et al. |

(Continued)

*Primary Examiner* — Jason C Olson

(57) ABSTRACT

A wake from OFF state system is described that enhances power adapters and battery chargers that have been shut completely off in efforts to conserve energy. Wake from OFF state devices may be used to automate the otherwise tedious process of turning on a power switch. A wake from OFF state device is distinguished from a wake from sleep state device which continues to consume some amount of power to operate in a standby mode. A wake from OFF state power adapter can be turned fully off and left off indefinitely. There are no active standby circuits, no power consumption, no active logic, no emissions, no heat, when the device is in this OFF state. Wake from OFF state is useful for a variety of devices including (but not limited to) smartphones, portable computers, power tools, electric vehicles, and rechargeable batteries.

19 Claims, 6 Drawing Sheets

Wake From OFF State System

(56) References Cited

U.S. PATENT DOCUMENTS

| | | |
|---|---|---|
| 8,385,036 B2 | 2/2013 | Koch |
| 8,402,175 B2 | 3/2013 | Hwang |
| 8,450,979 B2 | 5/2013 | Kerr et al. |
| 8,560,652 B2 | 10/2013 | Ewing et al. |
| 8,649,190 B2 | 2/2014 | Chen et al. |
| 8,788,852 B2 | 7/2014 | Chun et al. |
| 8,817,495 B2 | 8/2014 | Chen et al. |
| 8,830,073 B2 | 9/2014 | Sima et al. |
| 8,907,634 B2 | 12/2014 | Arai et al. |
| 8,990,461 B2 | 3/2015 | Ballot et al. |
| 9,020,648 B2 | 4/2015 | Doljack |
| 9,021,288 B2 | 4/2015 | Adewale et al. |
| 9,191,075 B2 | 11/2015 | Jung et al. |
| 9,356,468 B2 | 5/2016 | Kim |
| 9,493,087 B2 | 11/2016 | Leary |
| 9,506,976 B2 | 11/2016 | Marchand et al. |
| 9,507,398 B2 | 11/2016 | Lim |
| 9,509,171 B2 | 11/2016 | Lundgren et al. |
| 9,608,526 B2 | 3/2017 | Okura et al. |
| 9,755,698 B2 | 9/2017 | Hatanaka et al. |
| 2010/0194206 A1 | 8/2010 | Burdo et al. |
| 2011/0127953 A1 | 6/2011 | Walley et al. |
| 2011/0169341 A1 | 7/2011 | Manning |
| 2011/0221483 A1* | 9/2011 | Liu .......................... G06F 1/24 327/142 |
| 2012/0161547 A1 | 6/2012 | Serrano |
| 2012/0271468 A1* | 10/2012 | Doljack .................. H02J 9/005 700/286 |
| 2012/0326529 A1* | 12/2012 | Onishi .................... G06F 1/263 307/112 |
| 2013/0062959 A1 | 3/2013 | Lee et al. |
| 2013/0207455 A1* | 8/2013 | Doljack ................. H02J 7/0036 307/9.1 |
| 2013/0286701 A1 | 10/2013 | Im |
| 2014/0265566 A1* | 9/2014 | Nguyen ................. H02J 7/0068 307/23 |
| 2014/0302782 A1 | 10/2014 | Raab et al. |
| 2014/0312691 A1* | 10/2014 | Doljack ................. H02J 7/0036 307/29 |
| 2014/0312701 A1 | 10/2014 | Hong et al. |
| 2014/0347006 A1 | 11/2014 | Kim et al. |
| 2015/0006930 A1* | 1/2015 | Antonio .................. G06F 1/263 713/323 |
| 2015/0028802 A1 | 1/2015 | Lee et al. |
| 2016/0373166 A1 | 12/2016 | Yang et al. |

\* cited by examiner

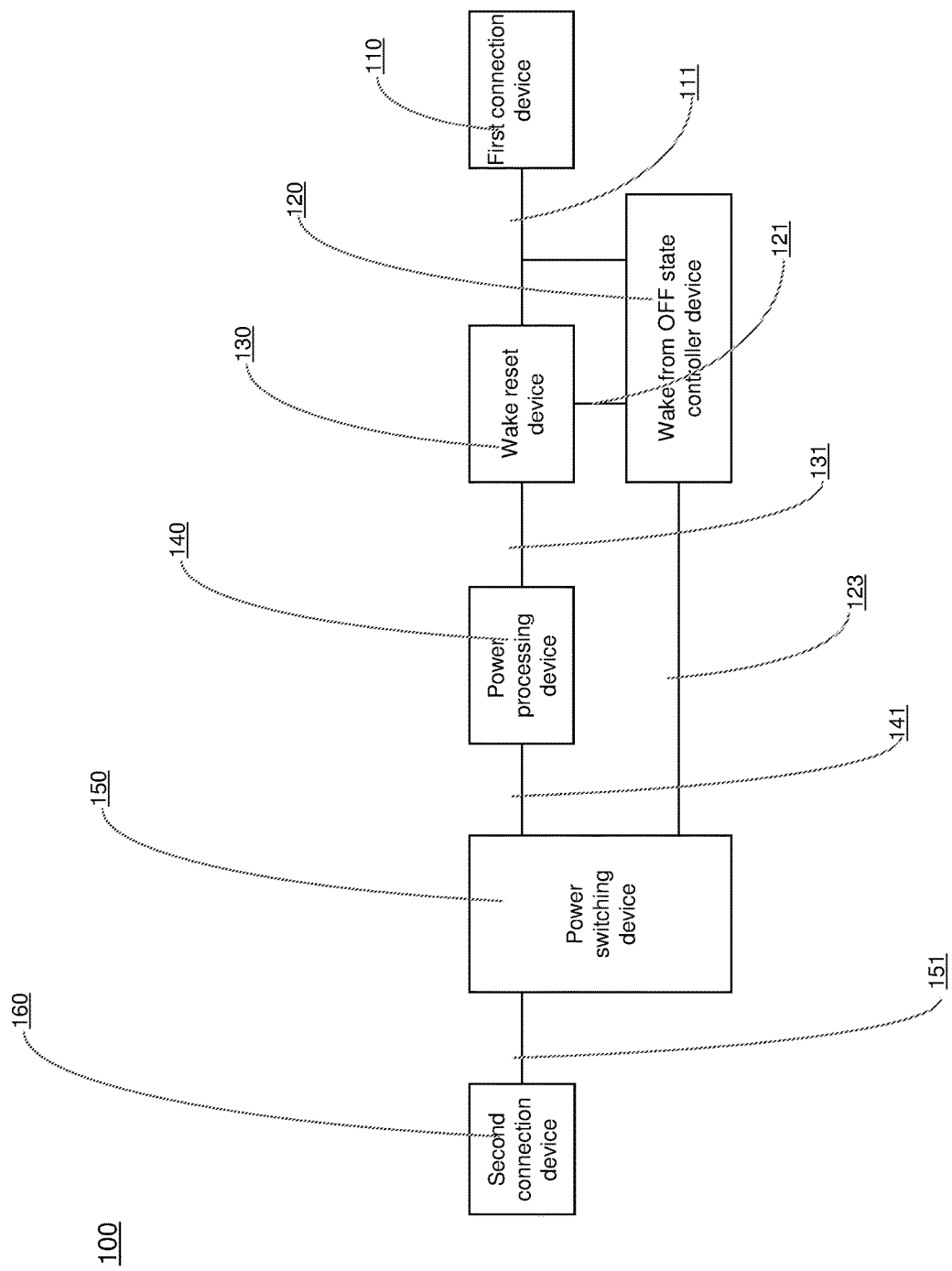

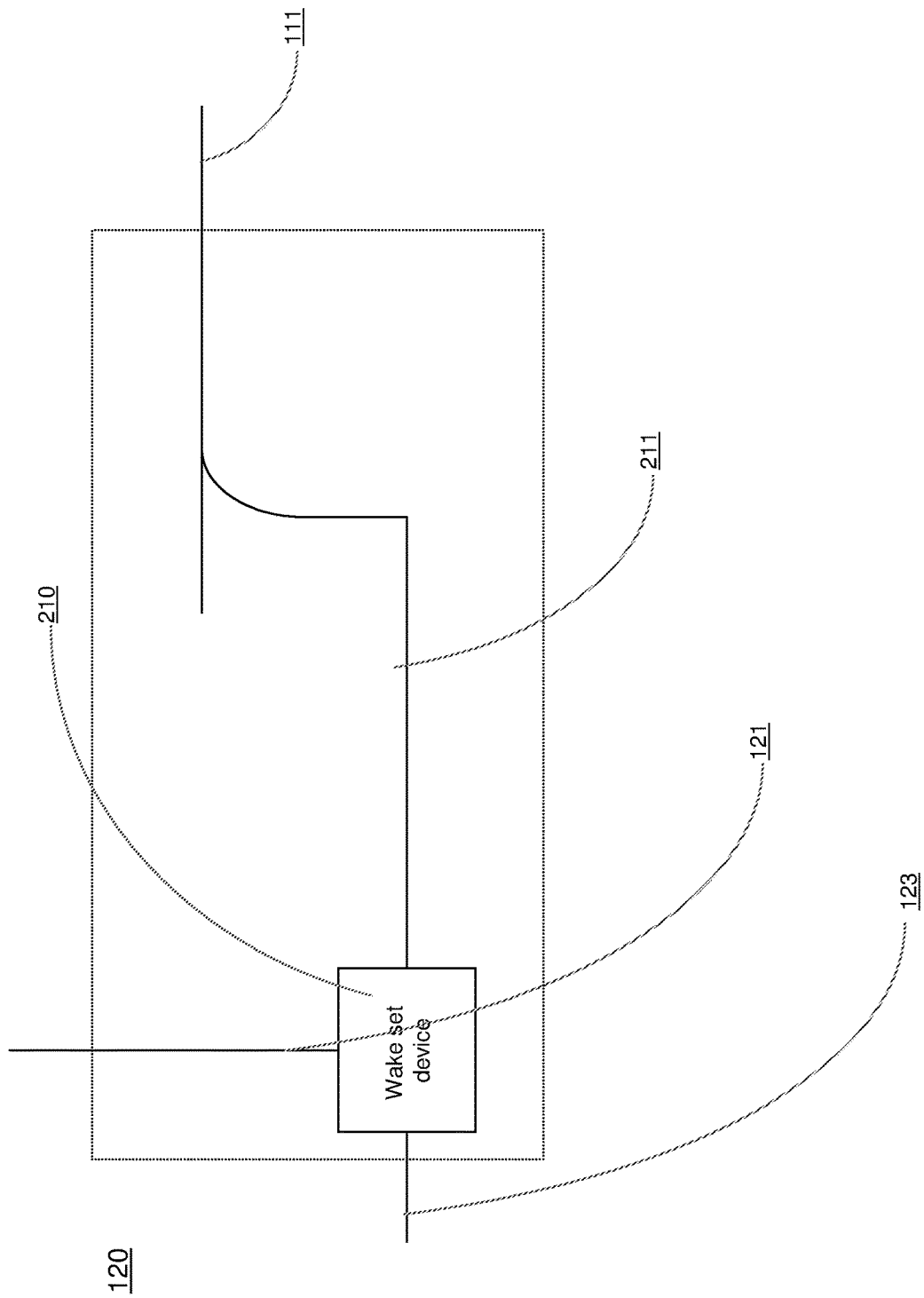
Figure 2, First Wake From OFF State Controller Device such as for Battery, Vehicle, or Portable Tool Chargers

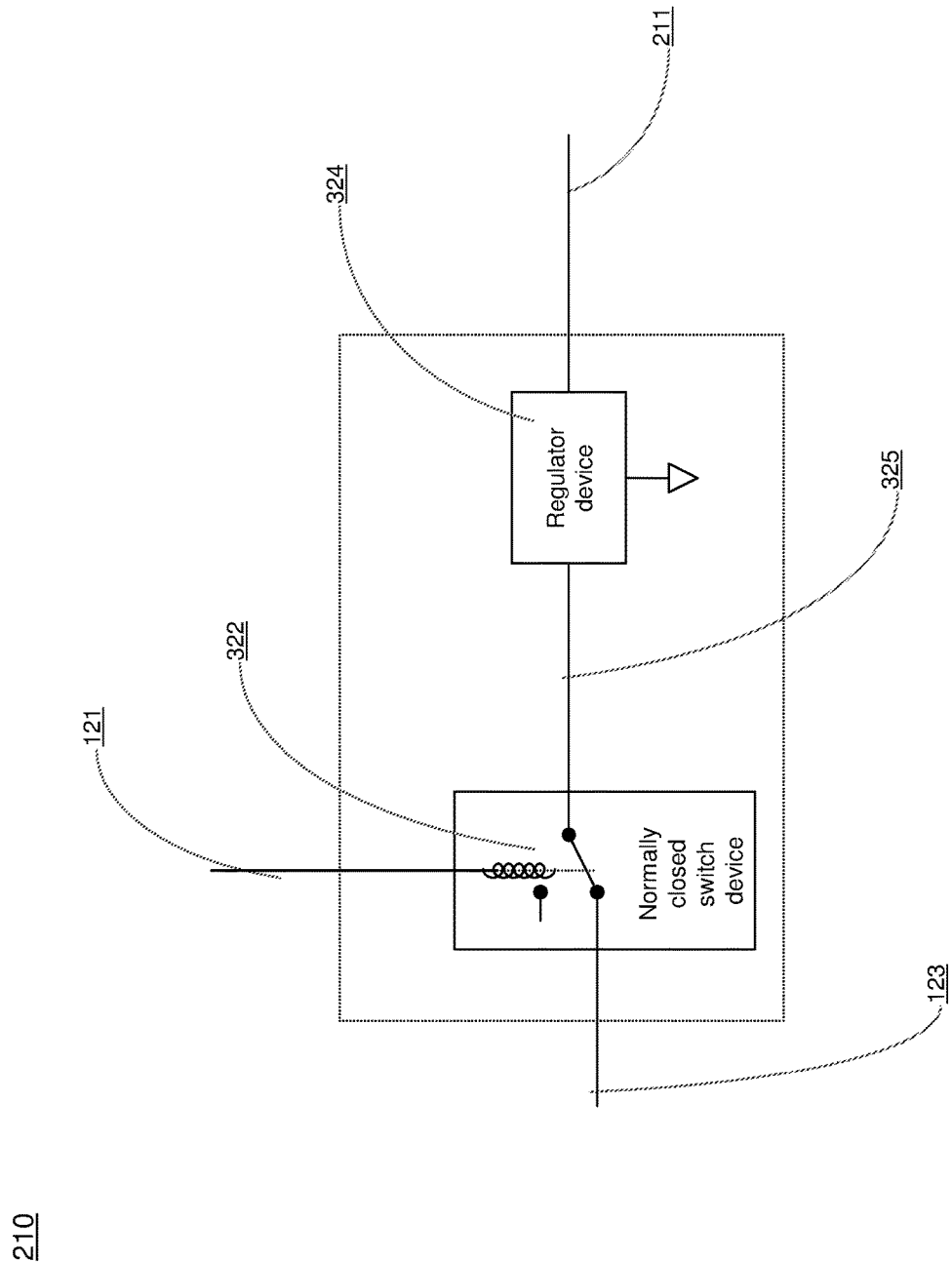
Figure 3, Wake Set Logic Device

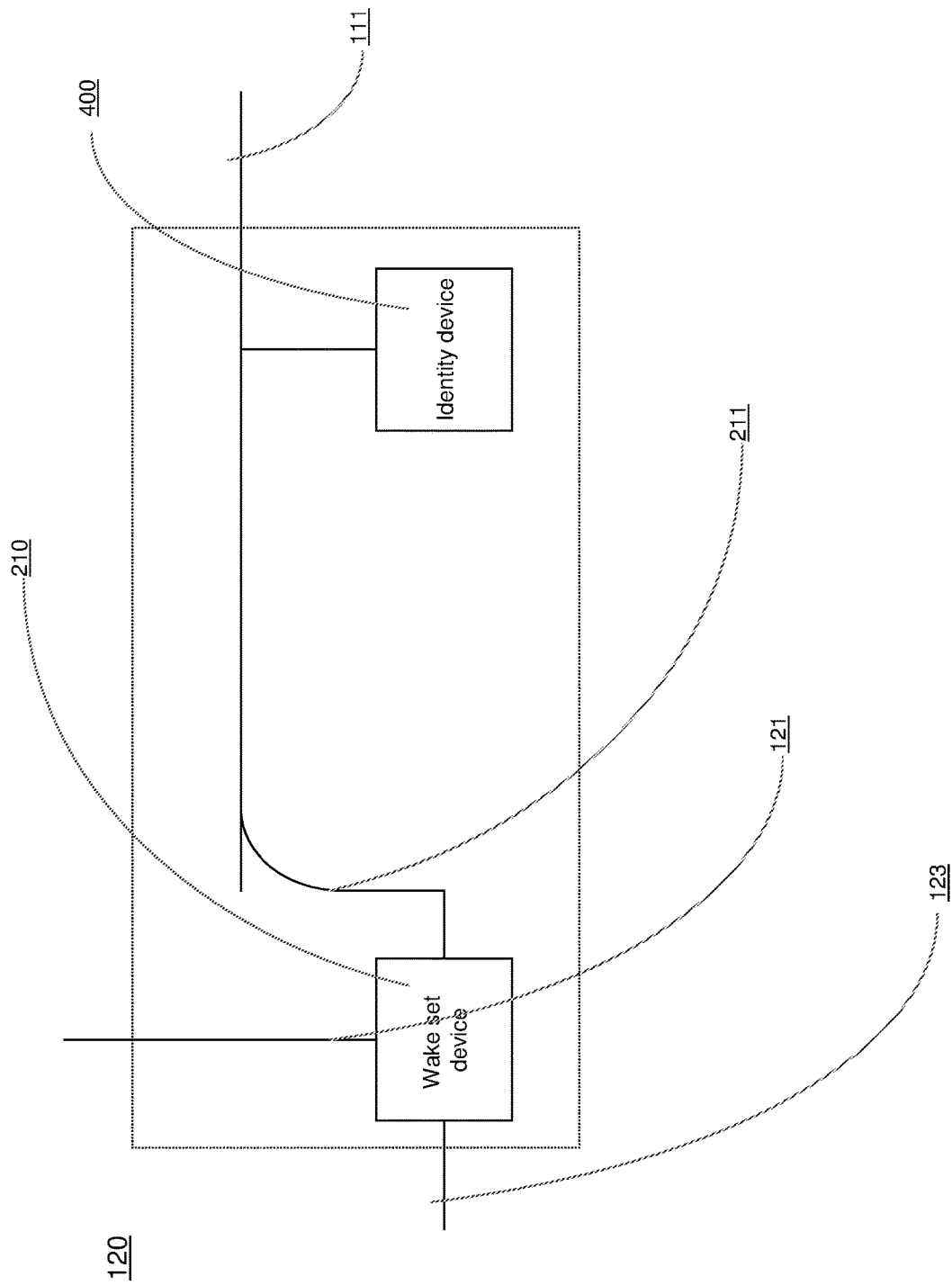
Figure 4, Second Wake From OFF State Controller Device such as for a Smart Power Adapter

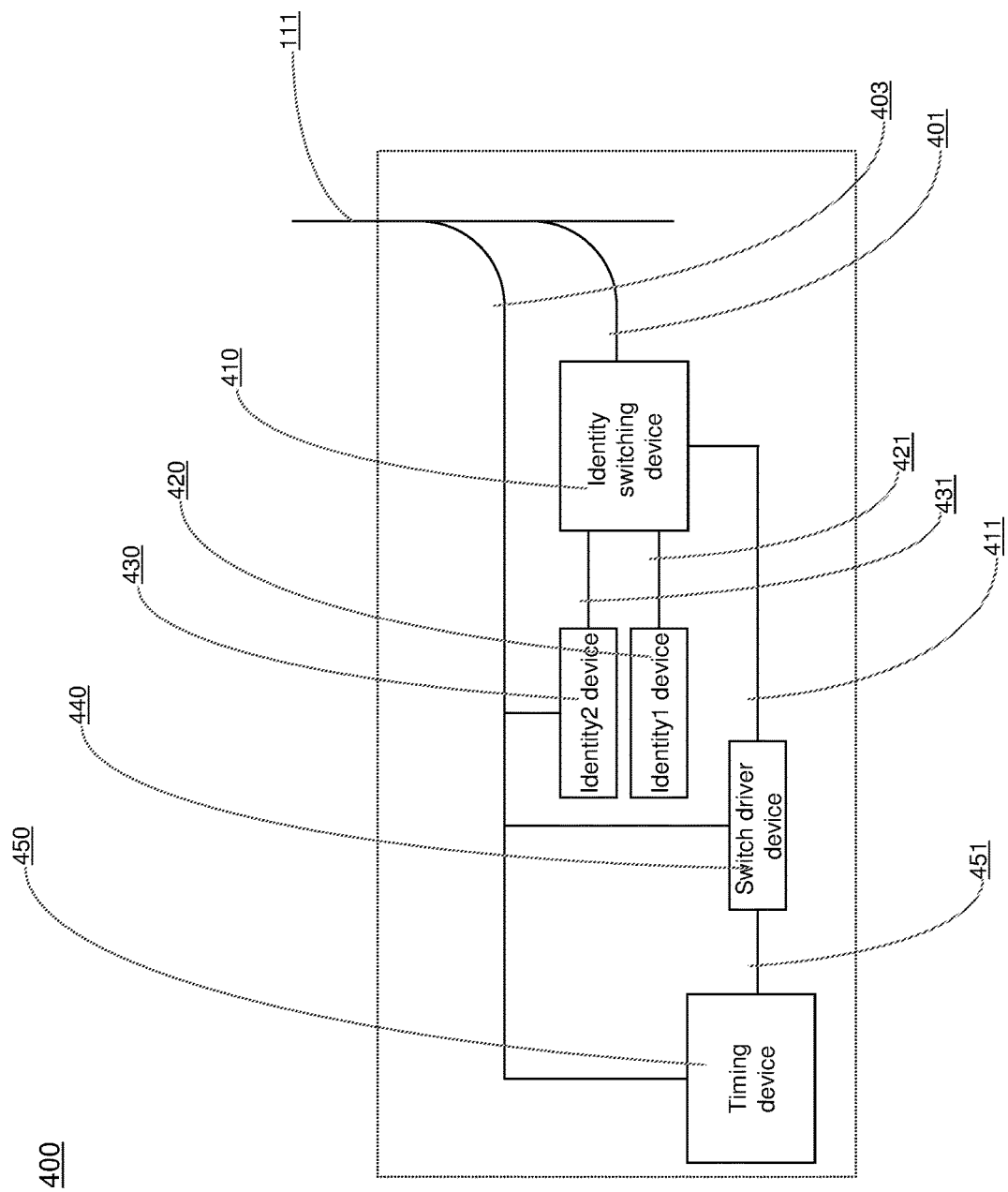
Figure 5, Identity Device

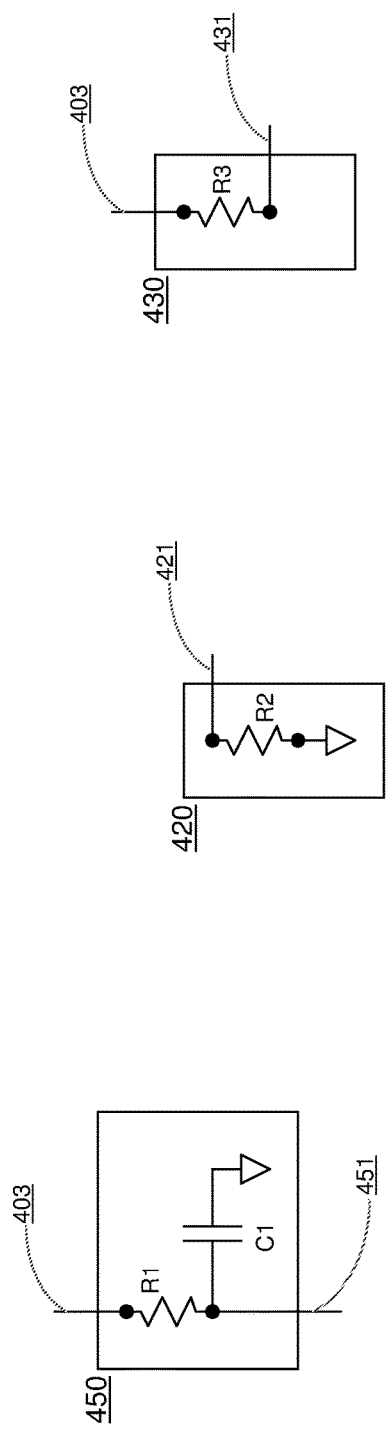
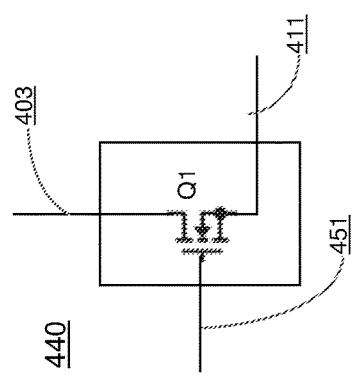
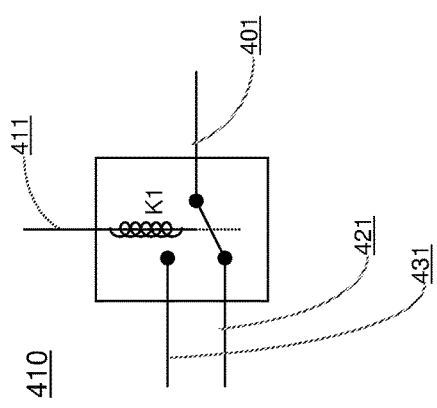
Figure 6a, Timing Device  Figure 6b, Identity1 Device  Figure 6c, Identity2 Device
Figure 6d, Identity Switching Device  Figure 6e, Identity Switch Driver Device
Figure 6a-e, Identity Logic Devices

WAKE FROM OFF STATE POWER SYSTEM

BACKGROUND OF THE INVENTION

Field of the Invention

Embodiments of the present invention generally relate to a power adapter system used to charge devices. More specifically, embodiments of the present invention relate to a solution for waking a power adapter that has been placed in an OFF state.

Description of the Related Art

Many devices and particularly electronics devices require a power adapter to operate, to charge or to recharge. There is a broad amount of related art on "sleeping" and "waking" portions of power adapters to improve efficiency and specifically to reduce the energy wasted when a power adapter is in a standby mode. Although the standby power consumption has been reduced, some art attempt to eliminate this standby power consumption. While entering an OFF state has been automated, previous attempts to wake from an OFF state have required undesirable solutions such as buttons or batteries. Manually operated buttons or switches were often forgotten or just left in the on position. Incorporating an internal energy storage device such as battery to operate the standby logic were not truly off, but rather attempts to manipulate the energy consumption calculation. Previous methods of wake from OFF state were ineffective.

The standby energy consumption is common to both wired and wireless systems. Wireless charging currently is or can be envisioned to be used at home, work, in vehicles, coffee houses, restaurants, airports, public locations, retail, parking lots and other places for operating or charging electronic devices small and large. Some vehicles such as cars include a wireless charging pad for smartphones and other devices. This is not to be confused with that fact that some wireless electric charging devices may also be used to charge electric vehicles. Previous to this invention, wireless charging devices consume energy remaining in standby when no external device is present to use the wireless charging. Examples include but are not limited to: Apple AirPower mat, Apple Watch magnetic charging cable, Apple Watch magnetic charging dock, Samsung Fast Charge wireless charging pads, Samsung Gear wireless chargers, Qi chargers, smartphone wireless chargers, watch wireless chargers, wireless electric car chargers, and Ikea furniture accessories. There are huge growing numbers of wired and wireless chargers that remain idle consuming standby energy.

Many people charge their phones using a USB power adapter in their vehicle. This power adapter may be built-in or purchased after-market. Many do not realize that whenever the vehicle is operating, most of these inexpensive USB power adapters are consuming power even through no external device is attached. These power adapters may also have a shorter useful life failing prematurely even though they are used infrequently.

To better appreciate the benefits of this invention, it is particularly important to understand the subtle distinction between "sleep states" and an "OFF state".

The term "OFF state" is used to describe a condition in which the power adapter is neither consuming external energy nor consuming internal energy. OFF state is also defined such that there is no active logic since there is no power to operate standby logic, semiconductor devices, transistors, or other component devices. This is important not just for energy savings, but also to eliminate electromagnetic emissions, heat, noise, vibration, and/or other side effects. Some countries including the EU (European Union) mandate various devices to include a manually operated switch to allow consumers to have an option for just such an OFF state. Further, it is well known that a significant percentage of these devices are left on due to forgetfulness or simply the inconvenience of manually flipping this button or switch.

In contrast, "sleep states" generally describes device modes that are a lower, non-zero, energy condition with a standby logic that is actively waiting and is thus consuming energy. Sleep is almost but not quite off. Sleep, by definition, has a small portion of the device that is active. Even the best of us must be extra alert not to misinterpret a reference to a sleep state to be the same as a reference to an OFF state. Even the most knowledgeable of us incorrectly use the term "off" as a casual way to describe a device that is really in a sleep state consuming energy in a standby mode. It is well published that larger numbers of devices that are in a sleep state for longer periods of time are collectively an undesirable and inefficient design practice.

Previous to this invention, there are many inventions within the field of putting a device into a lower power sleep state, many of which are more then several decades old. A portable computer is one example of a device that automatically sleeps when perceived as idle. Similarly, waking a portable computer from a sleep state is well understood. While achieving a sleep state and a wake state has symmetry, automation to achieve an on state vs. an OFF state is not symmetric. An important distinction is that if such a portable computer is in an OFF state, a manual button is used to wake the computer. A computer can turn off by itself, but once off, the same computer cannot turn on by itself. It is understood that in some cases the button may be incorporated within an action such as opening the lid of a notebook computer. A button is required to wake from an OFF state since there is no power to the standby logic that would be used to wake the computer from a sleep state.

Previous to this invention, there are many inventions within the field of reducing the power consumption of a power adapter in a sleep state. Such inventions attempt to reduce clock rates and/or voltage levels for switching power supply controllers, etc. to minimize the sleep state energy consumed. These inventions reinforce the notion that a small standby circuit must be active to wake the power adapter. These inventions to constantly refine and reduce the sleep state energy consumption to smaller and smaller (non-zero) numbers help to confirm that it was neither easy nor obvious to automatically wake a power adapter from an OFF state.

Previous to this invention, a number of inventors disclose the use of an internal energy storage device such as a battery to provide energy to portions of the power adapter during the sleep state. It is an important distinction to understand that the power input to the power adapter may appear to be consuming zero energy while in reality this internal standby circuit is consuming power from an internal energy storage device. A knowledgeable person would agree that a portion of such a power adapter's logic is not in an OFF state since it is still active and powered by the energy storage device.

This is further confirmed with the observation that this power adapter may likely be emitting electromagnetic emissions and/or heat in a sleep state. Another important observation is that battery energy depletes and when the battery falls below a certain level of charge, the power adapter has failed until the battery is replaced or recharged. Replacing batteries to operate the standby logic is much the same as wasting energy. Recharging batteries are inefficient as indicated by the waste heat produced. Rechargeable batteries have a number of useful charging cycles and after a period of time also need to be replaced.

Ultimately, incorporating an energy storage device within a power adapter shifts the time at which energy is wasted. This shifting of time expends the same plus additional overhead energy. Inventions that use a battery are unlikely to save any additional energy and many actually increase the amount of wasted energy; contrary to the perceptual input power activity during a narrow period of time. For proper accounting, the calculation of total energy consumed must include not only the input, but also all the energy associated with the storage device or battery over a meaningful time period.

Previous to this invention, there are a variety of art collectively described as smart plugs. Smart plugs also include smart power strips. These smart plugs can be partitioned in two sections. One section is used to control the other section. Thus a standby logic of the smart plug device remains active consuming power even if the other section is in an OFF state. When considered in total, the smart plug device is in a sleep state consuming energy to support the standby logic.

Previous to this invention, there is art that describes an external computer that is attached to an un-switched portion of the smart plug and used to wake and sleep the other switched portion. When the external computer is in a sleep state, then the corresponding un-switched plug is passing power to that computer standby logic. When the external computer is in an OFF state, then the computer must be turned on using a manual button before the smart plug's automated wake functions can operate. The same subtle understanding is that when the entire smart plug is in an OFF state, then a manual button is required.

Previous to this invention, logic designs and protocols are widely published. These power adapter designs, components, and protocols include: USB (Universal Serial Bus), USB OTG (On The Go), USB PD (Power Delivery), USB CC (Configuration Channel), USB DRP (Dual Role Port), Apple Thunderbolt, Apple Lightning, AC-DC converters, DC-DC converters, switching power supplies, isolation, wireless charging, magnetic induction, magnetic resonance, Qi (Wireless Power Consortium inductive charging), Airfuel wireless power transfer, Qualcomm Halo (wireless electric vehicle charging for stationary as well as moving vehicles), RFID (radio frequency identification), NFC (near field communication) and battery charging.

Previous to this invention, a USB specification describes a method using an OTG sense pin or CC (configuration channel) to discover and negotiate the power relationship between connected devices.

Previous to this invention, a USB power adapter is, by USB specification, defined as a source of power made available to the attached device. The USB specification dictates that a compliant power adapter presents a DFP (downstream facing port) which makes power available to an attached device. Improper design is considered incompatible and could otherwise damage either or both devices.

Previous to this invention, a power adapter used to charge a power tool has been designed to be a source of power which is made available to the attached power tool.

Previous to this invention, a power adapter within a battery charging device has been designed to be a source power which is made available to the attached battery.

Previous to this invention, portable battery chargers for smartphones, earbuds, and other devices require a power button to turn on the device. The previously mentioned button action may be explicit or integrated into some other action such as opening or closing a cover. Without such a button or switch, the standby power consumption would drain the energy from the internal battery and/or reduce the amount of useful energy available for charging externally attached devices. It is worthy to note that a portable battery charger may behave as a "power adapter" (to charge an external device such as a smartphone), as well as an "external device" (which uses a power adapter to recharge the battery within the portable battery charger).

Previous to this invention, many smartphones (cellular mobile telephones) have offered the ability to present a connector as a USB defined DRP (dual role port). Such a connection with DRP presents itself as such with no power available on the port until such time as the roles are negotiated.

Previous to this invention, electric vehicles and plug-in hybrid electric vehicles use a power adapter that consumes standby energy when no vehicle is attached. Previous to this invention, these vehicle chargers that consume standby energy use wired and wireless connections, as well as robotically positioned wired and wireless connections.

Previous to this invention, some electric vehicles for mass transit including but not limited to trains, buses, subways, and trolleys, use high-power overhead electric wires or high-power electrified third rails.

Previous to this invention, wake from a sleep state, wake from a standby state, and multiple levels of low energy states, are well understood.

Previous to this invention, sleep to an off state, by itself, is well understood.

SUMMARY OF THE INVENTION

The present invention describes a wake from OFF state system. Many intelligent power adapter devices can reduce power consumption to a standby level while waiting to be used and then wake up on demand. A wake from OFF state power adapter device may completely shut off power while waiting to be used and then wake up on demand!

A wake from OFF state battery charger is useful for rechargeable batteries used in flashlights, power tools, radios, toys, instruments, vehicles, and other devices. The inconvenience of "unplugging" the battery charger from the AC outlet to eliminate standby power consumption is resolved by a wake from OFF state device that shuts and more importantly wakes from OFF state automatically.

A wake from OFF state device saves energy. A wake from OFF state device is easy to use. A wake from OFF state device reduces heat. A wake from OFF state reduces electromagnetic emissions. A wake from OFF state device reduces vibration. A wake from OFF state device reduces noise.

A wake from OFF state logic device is useful for improving power adapter and battery charger logic, integrated circuits, and other devices.

A wake from OFF state identity device is useful for improving power adapter and battery charger logic, integrated circuits, and other devices.

A wake from OFF state power adapter is useful for smartphones, notebook computers, vehicles, robotic chargers, wireless chargers, and other devices. The inconvenience of a manual switch is eliminated while achieving the ultimate benefit of zero power consumption when the power adapter is "plugged into the wall" waiting to be attached to a phone or computer.

A wake from OFF state system improves reliability and extends the useful lifetime of semiconductor devices, power circuits, power adapters and battery chargers.

A wake from OFF state system improves safety by reducing the on-time for high-voltage lines and circuits such as but not limited to electric vehicle chargers, exposed sections of electric mass-transit overhead power lines, and exposed sections of electric mass-transit third rail power systems.

A wake from OFF state system reduces resistive energy loss in unused wires, distribution systems and networks.

A wake from OFF state system encourages environmentally healthy behavior through ease of use.

BRIEF DESCRIPTION OF THE DRAWINGS

Advantage of one or more disclosed embodiments may become apparent upon reading the following detailed description and upon reference to the drawings in which:

FIG. 1 is a schematic depicting an illustrative wake from OFF state system, according to one or more embodiments described herein;

FIG. 2 is a schematic depicting an illustrative first wake from OFF state controller device such as for (but not restricted to) battery, vehicle, or portable tool chargers, according to one or more embodiments described herein;

FIG. 3 is a schematic depicting an illustrative wake set logic device, according to one or more embodiments described herein;

FIG. 4 is a schematic depicting an illustrative second wake from OFF state controller device such as for (but not restricted to) a smart power adapter, according to one or more embodiments described herein;

FIG. 5 is a schematic depicting an illustrative identity device, according to one or more embodiments described herein;

FIGS. 6a, 6b, 6c, 6d and 6e are schematics depicting illustrative identity logic devices, according to one or more embodiments described herein;

DETAILED DESCRIPTION

Described herein are exemplary systems and methods for implementing a wake from OFF state system. In the following description, numerous specific details are set forth to provide a thorough understanding of various embodiments. However, it will be understood by those skilled in the art that the various embodiments may be practiced without the specific details. In other instances, well known methods, procedures, components, and circuits have not been illustrated or described in detail so as not to obscure the particular embodiments.

A normally closed switch is a shorted switch when there is no power or signal to explicitly establish that the switch is either open or closed. A single pole double throw switch is a circuit that consists of a normally closed terminal and a normally opened terminal, with a common output terminal.

A link may consist of one or more sublinks. Links and/or sublinks include but are not limited to optical, thermal, electrical, magnetic, wireless, radio frequency, light, laser, sound, ultrasonic, vibration, and/or virtual embodiments including but not limited to a variety of codification methods for power, data, and/or control signals. Links and/or sublinks may contain more then one type of signal as well as dynamically changing types of signals. Links and/or sublinks may be combined or partitioned. For example, to improve understanding the links or sublinks to communicate a wake signal and a sleep signal may have been partitioned; in practice, wake and sleep signals may be combined.

Connection devices include but are not limited to physical, mechanical, robotic, optical, thermal, electrical, magnetic, wireless, fluidic, radio frequency, light, later, sound, ultrasonic, vibration, input connectors, output connectors, bi-directional connectors, buses, RF antenna, inductor, wireless charging pad, light sensor, piezo sensor, and/or identity tag. Connection devices may and likely will use one or more technologies as well as combinations of technologies.

Some mechanisms to make compatible or protect individual component devices or entire systems are presumed and omitted to improve readability. These compatibility and protection methods include but are not limited to fuses to protect against excess current, diodes to restrict current flow direction, transformer isolation or optical isolation to protect against short circuits, drivers, protocol converters, or software.

External devices include but are not limited to: smartphones, notebook computers, cordless tools, batteries, smart batteries, and vehicles.

Vehicles include but are not limited to: electric vehicles, plug-in hybrid electric vehicles, buses, cars, trucks, trains, trolleys, subways, bikes, bicycles, motorcycles, scooters, skateboards, boats, submarines, and planes.

Power sources include but are not limited to: AC (alternating current), DC (direct current), batteries, power lines, power networks, transmission wires, storage, solar, fuel, heat, motion, chemical, pressure, or power harvesting.

Power processing devices include but are not limited to AC (alternating current) conversion, DC (direct current) conversion, constant current charging, constant voltage charging, feedback systems, switching power supplies, transformers, regulators, digital processing, analog processing, transmissions, and/or combinations of processing devices. This processing can be dynamically changing or fixed over time. Power processing devices may include features including but not limited to an output enable mechanism.

To better understand this "wake from OFF state" invention, the inverse "sleep to OFF state" signaling may be partitioned in this description.

It is presumed that a knowledgeable person would understand that the sequence of some or all items described in each of the figures might be reordered and/or that one more items described may be combined or further partitioned, to achieve the same or similar effect Various components described herein may be incorporated within an integrated circuit, incorporated as an enhancement to an integrated circuit, or redesigned into an electronic circuit for an integrated circuit.

Various components may be implemented using one or more software computer programs.

FIG. 1 is a schematic depicting an illustrative system 100 for a wake from OFF state system block diagram, according to one or more embodiments. In one or more embodiments, a first connection device 110 is attached to both a wake from OFF state controller device 120 and a wake reset device 130 via a first connection link 111. The first connection device may be used to attach to and detach from an appropriate external device.

The wake from OFF state controller device 120 is attached to a power switching device 150 via an on-off link 123.

The wake from OFF state controller device 120 is attached to the wake reset device 130 via a reset link 121.

The wake reset device 130 is attached to a power processing device 140 via a second connection link 131.

The power processing device 140 is attached to the power switching device 150 via a third connection link 141.

The power switching device 150 is attached to a second connection device 160 via a fourth connection link 151. The second connection device 160 is attached to an appropriate power source. In one or more embodiments, the power switching device 150 is a relay with an optical isolation switch. In one or more embodiments, the power switching device 150 is a TRIAC (bidirectional switch) with an optical isolation switch.

When initialized to or placed in the OFF state, the power switching device 150 is open, disabling power flow from a power source attached to the second connection device 160. When initialized to or placed in the OFF state, the wake from OFF state system 100 consumes no energy, is passive, and able to wait indefinitely for an external device to be attached to the first connection device 110.

After an appropriate external device is attached to the first connection device 110, power from the external device is carried upon the first link 111 to the wake from OFF state controller device 120. The wake from OFF state controller device 120 uses that energy to send a wake from OFF state signal over the on-off link 123 to the power switching device 150. When the power switching device 150 receives the wake from OFF state signal over the on-off link 123, it enables power from the power source attached to the second connection device 160. With power enabled to the power processing device 140, power is converted to a desirable form. Energy from the power processing device 140 is provided to the external device attached to the first connection device 110. The power used to wake and the power provided to the external device, may or may not share the same sublinks on the first connection link 111, as further described in later embodiments.

In one or more embodiments, the first connection device 110 incorporates a robotic docking system.

In one or more embodiments, the first connection device 110 supports a wireless protocol to connect to the external device. In one or more embodiments, the first connection device 110 supports a wireless charging protocol to receive power from the external device. In one or more embodiments, the first connection device 110 supports a wireless charging protocol to transmit power to the external device. In one or more embodiments, the connection device 110 supports a wireless communication protocol to communicate identity, data, or control information between the wake from OFF state system 100 and the external device. In one or more embodiments, the connection device 110 incorporates energy harvesting.

The power switching device 150 may be self-latching. If this is undesirable or if the external device is not able to maintain a wake from OFF state signal, the power from the power processing device 140 is used to latch the power switching device 150.

When an appropriate sleep to off criterion is achieved, the wake reset device 130 may send a reset message to the wake from OFF state controller device 120 via the reset link 121. Upon receiving such a reset message, the wake from OFF state controller device 120 sends a reset wake from OFF state signal via the on-off link 123 to the power switching device 150 which in turn disconnects the external power source attached to the second connection device 160. In one or more embodiments, this sleep to off state criteria includes a fixed or adjustable delay. In one or more embodiments, this sleep to off state criteria includes external device detection. In one or more embodiments, this sleep to off state criteria includes monitoring of energy consumption. In one or more embodiments, this sleep to off state criteria includes user adjustable preferences.

Power processing devices 140 frequently include power management features that may be integrated or enhanced with one or more functions performed by the wake from OFF state device 120, the wake reset device 130, and/or the power switching device 150. In one or more embodiments, the power processing device 140 incorporates an integrated circuit. In one or more embodiments, the power processing device 140 incorporates a microcontroller.

In one or more embodiments, the wake from OFF state system 100 is a power adapter for use in vehicles including but not limited to those with accessory ports (cigarette lighters), OBD2 (on-board diagnostic) ports, switched ports and/or un-switched power port.

FIG. 2 is a schematic depicting an illustrative system 120, for a first wake from OFF state controller device such as for but not limited to battery, vehicle or portable tool chargers, according to one or more embodiments. In one or more embodiments, a wake set device 210 is attached to a first connection link 111 via a wake from OFF sublink 211.

The wake set device 210 uses the wake from OFF sublink 211 from the first connection link 111 as energy to activate an on-off link 123. Energy to latch and thus maintain the on-off link 123 may be provided from the first connection link 111.

The wake set device 210 may be initialized using a signal via a reset link 121.

FIG. 3 is a schematic depicting an illustrative system 210 for a wake set logic device, according to one or more embodiments. In one or more embodiments, a normally closed switch device 322 connects a regulated wake signal link 325 to an on-off link 123. A reset link 121 is used to open the normally closed switch 322.

An optional regulator device 324 modifies a signal on the wake from OFF link 211 to produce an appropriate wake from OFF state signal on a regulated wake signal link 325 to a normally closed switch device 322. In one or more embodiments, the regulator device 324 is a linear voltage regulator.

Both the normally closed switch device 322 as well as the optional regulator device 324 require no standby energy and can wait indefinitely for a wake from OFF signal on the wake from OFF link 211.

FIG. 4 is a schematic depicting an illustrative system 120, for a second wake from OFF state controller device such as for but not limited to a smart power adapter, according to one or more embodiments. In one or more embodiments, an identity device 400 and a wake set device 210 are interconnected. The identity device 400 is attached to the first connection link 111 to initially communicate a first identity. At an appropriate time, the identity device 400 communicates a new identity different then the first identity. The first identity is passive requiring no standby power. The new identity may be passive or active using power once it is available on the first connection link 111. In one or more embodiments, the identity device 400 complies with USB protocol. In one or more embodiments, the identity device 400 supports a wireless communication protocol. In one or more embodiments, the wireless communication protocol is compliant to RFID. In one or more embodiments, the identity device 400 is a wireless identity device that requests power from the external device for a short period of time using a passive identity such as RFID or NFC.

The wake set device 210 uses a wake from OFF link or sublink 211 from the first connection link 111 as energy to activate the on-off link 123. Energy to latch the on-off link 123 may be provided from either or both the power processing device and/or the external device via the first connection link 111.

A reset link 121 is used to interrupt the wake set device 121 and thus deactivate the signal on the on-off link 123.

The amount of time for the identity device 400 to change identities is selected such that is it slow enough for the first connection link 111 to settle and provide a latching signal over the wake from OFF link 211, and fast enough to keep power conflicts on the first connection link 111 brief.

FIG. 5 is a schematic depicting an illustrative system 400 for an identity device according to one or more embodiments. In one or more embodiments, an identity switching device 410, an identity1 device 420, an identity2 device 430, a switch driver device 440, a timing device 450, and a first connection link 111 are interconnected.

A first connection data sublink 401 and a first connection power sublink 403 are extracted from the first connection link 111. The identity switching device 410 is attached to the identity1 device 420 via identity1 link 421, to the identity2 device 430 via the identity2 link 431, and to the switch driver device 440 via a switch driver link 411. Requiring no energy, the identity switching device 410 normally presents identity1 420 via the identity1 link 421 to the first connection data sublink 401. As previously mentioned, the identity switching device 410 has a normally closed path that presents the identity1 link 421 on the first connection data sublink 401. In one or more embodiments, the first connection data sublink 401 is compliant with USB protocol. In one or more embodiments, the first connection data sublink 401 is a compliant with a wireless communication protocol. In one or more embodiments, the first connection data sublink 401 is compliant to RFID wireless protocol.

The identity2 device 430, timing device 450, and switch driver device 440 are attached to the first connection link 111 via the first connection power sublink 403. The timing device 450 is further attached to the switch driver device 440 via an identity swap link 451. The switch driver device 440 is attached to the identity switching device 410 via a switch driver link 411. The identity2 device may optionally use power via the first connection power sublink 403.

As energy becomes available via the first connection power sublink 403, the timing device 450 is configured to delay the change from a first identity1 to an alternate identity2. The switch driver device 440 provides an appropriate signal to activate the identity switching device 410 based on the signal from the timing device 450 via the identity swap link 451.

FIG. 6a is a schematic depicting an illustrative system for a timing device 450, according to one or more embodiments. In one or more embodiments, an optimal wake from OFF state signal is transmitted over an identity swap link 451. Power obtained from a power link 403 is used to energize a circuit consisting of a resistor device R1 and a capacitor device C1. The optimal time constant is selected to best match the response times of both internal and external devices such that power is maintained on the power link 403.

FIG. 6b is a schematic depicting an illustrative system for an identity1 device 420, according to one or more embodiments. In one or more embodiments, an identity1 signal is transmitted over the identity1 link 421. When this identity1 device 420 is in an OFF state, this identity1 device 420 requires no power and can wait indefinitely to perform the intended function. The resistor device R2 is selected to be in compliance with USB specification.

FIG. 6c is a schematic depicting an illustrative system for an identity2 device 430, according to one or more embodiments. In one or more embodiments, an identity2 signal is transmitted over an identity2 link 431. The resistor device R3 is selected to be in compliance with USB specification using power from the power link 403.

FIG. 6d is a schematic depicting an illustrative system for an identity switching device 410, according to one or more embodiments. In one or more embodiments, a logic switching device K1 changes between: connecting the identity1 link 421 to a first connection data sublink 401, and connecting the identity2 link 431 to the first connection data sublink 401, based upon a control signal from switch driver link 411. In the absence of a control signal from switch driver link 411, the default behavior of the logic switching device K1 is to connect the identity1 link 421 to the first connection data sublink 401. In one or more embodiments, the first connection data sublink 401 is compliant with USB CC (configuration channel) specification.

FIG. 6e is a schematic depicting an illustrative system for an identity switch driver device 440, according to one or more embodiments. In one or more embodiments, a switch driver logic device Q1 uses power from the power link 403 to send an appropriate signal upon receiving a signal on the identity swap link 451 on the switch driver link 411.

What is claimed is:

1. A wake from off state power adapter system comprising:
    a first connection device;
    a wake reset device connected to said first connection device;
    a wake from off state controller device connected to said wake reset device and said first connection device;
    a power processing device connected to said wake reset device;
    a power switching device connected to said wake from off state controller device and said power processing device;
    a second connection device connected to said power switching device;
    wherein when the power switching device is off, no power from the second connection device is consumed by the wake from off state power adapter system;
    wherein the wake from off state controller device receives power from an external device attached to the first connection device to initiate waking the wake from off state power adapter system from an off state;
    wherein the wake from off state controller device uses the received power to turn on the power switching device;
    wherein when the power switching device is on, power from an external power source attached to the second connection device can be configured by the power processing device to be used by the wake from off state power adapter system and the first connection device.

2. The system of claim 1,
    wherein the wake from off state controller device consists of a normally closed switch device, wherein said normally closed switching device is a shorted switch when there is no power or signal to explicitly establish that the switch is either open or closed, and a regulator device;
    wherein the regulator device regulates the power from the first connection device;

wherein the normally closed switch device connects the regulated power from the regulator device to the power switching device.

3. The system of claim 1,
wherein the wake from off state controller device is a system comprising:
a wake set device;
an identity device;
wherein the identity device initially presents itself as requiring power from an external device attached to the first connection device;
wherein the wake set device uses power from the first connection device to turn on the power switching device;
wherein the identity device, upon establishing internal power on the power processing device, modifies the identity to disable power from the external device attached to the first connection device.

4. The system of claim 3,
wherein the identity device incorporates a wireless communication protocol.

5. The system of claim 3,
wherein the identity device is a system comprising:
an identity switching device;
an identity1 device connected to said identity switching device;
an identity2 device connected to said identity switching device;
a timing device connected to said identity switching device;
wherein the identity switching device requires no power on the identity device to present said identity1 device to the first connection device;
wherein the timing device, upon receiving power, establishes a delay time for the identity switching device to present said identity2 device to the first connection device.

6. The system of claim 5,
wherein the identity switching device is a single pole double throw switch;
wherein the identity1 device is a pull-down resistor connected to the normally closed terminal of the single pole double throw switch;
wherein the identity2 device is a pull-up resistor connected to the normally open terminal of the single pole double throw switch;
wherein the timing device is a resistor and capacitor network that defines an RC time constant;
wherein the wake set device consists of a normally closed switch device wherein said normally closed switch device is a shorted switch when there is no power or signal to explicitly establish that the switch is either open or closed.

7. The system of claim 1,
wherein the first connection device incorporates a robotic power connector docking system.

8. The system of claim 1,
wherein the first connection device incorporates a wireless power protocol to provide power to the external device.

9. The system of claim 1,
wherein the first connection device incorporates a wireless power protocol to obtain wake from off state power from the external device.

10. The system of claim 1,
wherein the second connection device is a vehicle accessory power port.

11. The system of claim 1,
wherein the wake from off state controller device is a link or sublink between the first connection device and the power switching device,
wherein a system reset is performed by the power processing device.

12. A wake from off state controller device comprising:
a wake from off link;
an on-off link, which is activated using said wake from off link;
an identity device connected to said wake from off link;
a wake set device connected to said wake from off link and which activates said on-off link using said wake from off link;
wherein when in an off state, no power is consumed by the wake from off state controller device;
wherein the identity device presents a first identity that requests power from an external device to the wake from off link;
wherein the wake set device uses power from the wake from off link to initiate a wake from off signal on the on-off link;
wherein the identity device modifies the first identity to a second identity to disable power from the external device.

13. The device of claim 12,
wherein the wake set device is a wake set logic device comprising:
a normally closed switch device, wherein said normally closed switching device is a shorted switch when there is no power or signal to explicitly establish that the switch is either open or closed;
a regulator device;
wherein the normally closed switch device connects the regulated wake from off signal to the on-off link;
wherein the regulator device modifies the signal on the wake from off link to be appropriate signal for the on-off link.

14. The device of claim 12,
wherein the identity device incorporates a wireless communication protocol.

15. An identity device comprising:
an identity switching device;
an identity1 device connected to said identity switching device;
an identity2 device connected to said identity switching device;
a switch driver device connected to said identity switching device;
a timing device connected to said switch driver device;
a first connection device connected to said identity switching device, said identity2 device, said switch driver device and said timing device;
wherein the identity switching device requires no power to present identity1 device to the first connection device;
wherein the timing device establishes a delay time for the identity switching device to present identity2 device to the first connection device.

16. The device of claim 15,
wherein the identity switching device consists of a single pole double throw switch.

17. The device of claim 15,
wherein the identity device incorporates a wireless communication protocol.

18. The device of claim 17,
wherein the wireless communication protocol conforms to RFID specification.

19. The device of claim 15,
wherein the first connection device is compatible to USB Configuration Channel (CC) specification.

* * * * *